United States Patent
Shroff et al.

(10) Patent No.: US 10,586,195 B2
(45) Date of Patent: Mar. 10, 2020

(54) SYSTEM AND METHOD FOR PRESCRIPTIVE ANALYTICS

(71) Applicant: Tata Consultancy Services Limited, Mumbai (IN)

(72) Inventors: Gautam Shroff, Gurgaon (IN); Puneet Agarwal, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 312 days.

(21) Appl. No.: 14/791,973

(22) Filed: Jul. 6, 2015

(65) Prior Publication Data
US 2016/0004987 A1    Jan. 7, 2016

(30) Foreign Application Priority Data
Jul. 4, 2014 (IN) .......................... 2177/MUM/2014

(51) Int. Cl.
G06Q 10/06    (2012.01)
G06Q 30/02    (2012.01)

(52) U.S. Cl.
CPC ..... *G06Q 10/06375* (2013.01); *G06Q 10/067* (2013.01); *G06Q 30/02* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS 5,461,699 A * 10/1995 Arbabi ..................... G06N 3/04
706/21
6,895,398 B2 * 5/2005 Evans-Beauchamp ......................
G06N 7/005
706/50

(Continued)

FOREIGN PATENT DOCUMENTS

WO    WO-2004090659 A2 * 10/2004    ............. G06N 5/003
WO    WO-2005043331 A2 *  5/2005    ....... G06Q 10/06316

(Continued)

OTHER PUBLICATIONS

Jackson, Christopher H., Linda D. Sharples, and Simon G. Thompson. "Structural and parameter uncertainty in Bayesian cost-effectiveness models." Journal of the Royal Statistical Society: Series C (Applied Statistics) 59.2 (2010): 233-253.*

(Continued)

Primary Examiner — Thomas L Mansfield
Assistant Examiner — Derick J Holzmacher
(74) Attorney, Agent, or Firm — Shumaker, Loop & Kendrick, LLP (57) ABSTRACT

The present subject matter discloses system and method for executing prescriptive analytics. Simulation is performed from an input data ($x_{input}$) and simulation parameters ($\mu$) to generate simulating data (D). Further, forecast data may be predicted by processing the simulating data (D) using predictive model (M). Further, prescriptive value (x') may be determined based on the forecast data by using optimization model. The prescriptive value (x') may be determined such that an objective function associated with the optimization model is optimized, whereby the optimization of the objective function indicates business objective being achieved. Further, the steps of simulating, predicting and determining may be iteratively performed until the objective function is not further optimized, satisfying predefined condition. Fur- (Continued)

ther, at each iteration, except the first iteration, the input data ($x_{input}$) is the prescriptive value (x') determined at immediate previous iteration, whereby at the first iteration, the input data ($x_{input}$) is a reference data.

10 Claims, 7 Drawing Sheets

(56) References Cited

U.S. PATENT DOCUMENTS

| | | | | |
|---|---|---|---|---|
| 7,313,532 | B2* | 12/2007 | Mariamova | G06Q 10/04 705/7.25 |
| 7,546,222 | B2* | 6/2009 | Chintalapti | G06F 11/3409 702/186 |
| 8,055,358 | B2 | 11/2011 | Blevins et al. | |
| 8,818,932 | B2* | 8/2014 | Nolan | G06N 7/005 706/55 |
| 8,862,493 | B2* | 10/2014 | Fritzsche | G06Q 10/04 705/7.36 |
| 2003/0046130 | A1* | 3/2003 | Golightly | G06Q 10/04 705/7.24 |
| 2003/0126104 | A1* | 7/2003 | Evans-Beauchamp | G06N 7/005 |
| 2003/0167265 | A1* | 9/2003 | Corynen | G06Q 10/04 |
| 2004/0059696 | A1* | 3/2004 | Kropaczek | G06F 17/50 706/46 |
| 2004/0139037 | A1* | 7/2004 | Paleologo | G06Q 30/06 705/412 |
| 2004/0181441 | A1* | 9/2004 | Fung | G06Q 10/04 705/7.36 |
| 2005/0096950 | A1* | 5/2005 | Caplan | G06Q 10/06314 705/7.24 |
| 2006/0200333 | A1* | 9/2006 | Dalal | G06F 17/5009 703/17 |
| 2007/0067195 | A1* | 3/2007 | Fahner | G06Q 10/00 705/35 |
| 2008/0059284 | A1* | 3/2008 | Solotorevsky | G06Q 10/04 705/7.38 |
| 2008/0133435 | A1* | 6/2008 | Chintalapti | G06F 11/3409 706/12 |
| 2008/0189237 | A1* | 8/2008 | Crivat | G06N 7/00 |
| 2008/0319727 | A1* | 12/2008 | Horvitz | G06F 9/4443 703/13 |
| 2009/0150325 | A1* | 6/2009 | De | G06N 7/005 706/52 |
| 2010/0049538 | A1* | 2/2010 | Frazer | G06Q 30/02 705/14.4 |
| 2011/0054865 | A1* | 3/2011 | Fritzsche | G06Q 10/04 703/6 |
| 2012/0023043 | A1* | 1/2012 | Cetin | G06N 7/005 706/12 |
| 2012/0078678 | A1* | 3/2012 | Pradhan | G06Q 10/06 705/7.27 |
| 2012/0102053 | A1 | 4/2012 | Barrett et al. | |
| 2012/0253876 | A1 | 10/2012 | Hersch | |
| 2013/0191185 | A1* | 7/2013 | Galvin | G06Q 30/01 705/7.37 |
| 2014/0156568 | A1* | 6/2014 | Ganguly | G06Q 10/0637 706/12 |
| 2014/0278239 | A1* | 9/2014 | MacAro | G06F 17/18 702/181 |
| 2014/0358831 | A1* | 12/2014 | Adams | G06N 7/005 706/12 |
| 2015/0195136 | A1* | 7/2015 | Mermoud | H04L 41/5025 706/12 |
| 2015/0226660 | A1* | 8/2015 | Agnihotram | G01N 17/00 702/34 |

FOREIGN PATENT DOCUMENTS

| | | | | |
|---|---|---|---|---|
| WO | WO 2008157811 | A1 * | 12/2008 | G06F 9/4443 |
| WO | WO-2008157811 | A1 * | 12/2008 | G06F 9/451 |

OTHER PUBLICATIONS

Baio, Gianluca, and A. Philip Dawid. "Probabilistic sensitivity analysis in health economics." Statistical methods in medical research 24.6 (2015): 615-634.*

Golovin, Daniel, Andreas Krause, and Debajyoti Ray. "Near-optimal bayesian active learning with noisy observations." Advances in Neural Information Processing Systems. 2010.*

Lau, Amy Hing-Ling, and Hon-Shiang Lau. "Some two-echelon style-goods inventory models with asymmetric market information." European Journal of Operational Research 134.1 (2001): 29-42. (Year: 2001).*

Golovin, Daniel, Andreas Krause, and Debajyoti Ray. "Near-optimal bayesian active learning with noisy observations." Advances in Neural Information Processing Systems. 2010. (Year: 2010).*

Jackson, Christopher H., Linda D. Sharples, and Simon G. Thompson. "Structural and parameter uncertainty in Bayesian cost-effectiveness models." Journal of the Royal Statistical Society: Series C (Applied Statistics) 59.2 (2010): 233-253. (Year: 2010).*

Baio, Gianluca, and A. Philip Dawid. "Probabilistic sensitivity analysis in health economics." Statistical methods in medical research 24.6 (2015): 615-634. (Year: 2015).*

Cooper, Gregory F. "The computational complexity of probabilistic inference using Bayesian belief networks." Artificial intelligence 42.2-3 (1990): 393-405. (Year: 1990).*

Blasch, E.; Steinberg, A.; Das, S.; Llinas, J.; Chong, C.; Kessler, O.; Waltz, E.; White, F., "Revisiting the JDL Model for Information Exploitation", Jul. 9-12, 2013, (8 pages).

* cited by examiner

SYSTEM AND METHOD FOR PRESCRIPTIVE ANALYTICS

CROSS-REFERENCE TO RELATED APPLICATIONS AND PRIORITY

The present application claims priority from Indian patent application 2177/MUM/2014 filed on Jul. 4, 2014.

TECHNICAL FIELD

The present subject matter described herein, in general, relates to a method and a system for data analytics, more specifically, providing prescriptive analytics.

BACKGROUND

Data plays a vital role in today's business analytics environment. Specially, when big data comes under consideration, it becomes a critical task to handle and manage such big data. Also, the big data in its unprocessed state doesn't provide any value which may be useful in the business analytics. For providing the business analytics and deriving business insights from the big data, numerous data analytics techniques are available in the art. Most of the data analytics techniques are based on predictive analytics. In the predictive analytics, by performing statistical analysis of historical or past data probable future possibilities can be predicted for an event or situation occurring in a business environment.

The probable future possibilities predicted in the predictive analytics may indicate possible risks or opportunities in the future. Based on the risks or the opportunities predicted, business personnel may have to take decisions manually. Such manual decisions are often not comprehensive and reliable. Further, no support is provided in taking decisions based on the future possibilities predicted. Decisions are generally made to choose a right or correct strategy which can improve the future possibilities predicted. However, the predictive analytics are limited to providing only future possibilities or future outcomes, and hence are not able to provide decisions for taking advantage from the opportunities or mitigate the risks predicted as the future possibilities. Therefore, the predictive analytics are not of much value unless they support decision making process. Hence, there is a long-felt need for methods and systems that would help in deriving business decisions based on data analytics.

SUMMARY

This summary is provided to introduce aspects related to systems and methods for prescriptive analytics implemented are further described below in the detailed description. This summary is not intended to limit the scope of the subject matter.

In one implementation, a system for executing prescriptive analytics is disclosed. The system comprises a processor and a memory coupled to the processor for executing a plurality of modules stored in the memory. The plurality of modules comprises a simulating module, a predicting module, a determining module, and iterative module. The simulating module simulates from an input data ($x_{input}$) and simulation parameters ($\mu$), using a simulation model, in order to generate simulating data (D). The predicting module predicts forecast data by processing the simulating data (D) using a predictive model. Further, the determining module determines a prescriptive value (x') based on the forecast data by using an optimization model. Further, the optimization model determines the prescriptive value (x') in a manner such that an objective function associated with the optimization model is optimized, whereby the optimization of the objective function indicates a business objective being achieved. Further, the iterative module instructs the simulating module, the predicting module, and the determining module to iteratively perform the steps of the simulating, the predicting and the determining respectively until the objective function is not further optimized, satisfying a predefined condition. Further, in each iteration, except the first iteration, the input data ($x_{input}$) is the prescriptive value (x') determined at immediate previous iteration, whereas in the first iteration, the input data ($x_{input}$) is a reference data.

In another implementation, a method for executing prescriptive analytics is disclosed. The method may comprise simulating from an input data ($x_{input}$) and simulation parameters ($\mu$), using a simulation model, in order to generate simulating data (D). The method may further comprise predicting forecast data by processing the simulating data (D) using a predictive model. Further, the method may comprise determining a prescriptive value (x') based on the forecast data by using an optimization model. Further, the optimization model determines the prescriptive value (x') in a manner such that an objective function associated with the optimization model is optimized, whereby the optimization of the objective function indicates a business objective being achieved. Further, the method may comprise iteratively performing the steps of the simulating, the predicting and the determining, by a processor, until the objective function is not further optimized, satisfying a predefined condition. Further, in each iteration, except the first iteration, the input data ($x_{input}$) is the prescriptive value (x') determined at immediate previous iteration, whereas in the first iteration, the input data ($x_{input}$) is a reference data.

Yet in another implementation a non-transitory computer readable medium embodying a program executable in a computing device for executing prescriptive analytics is disclosed. The program comprising a program code for simulating from an input data ($x_{input}$) and simulation parameters ($\mu$), using a simulation model, in order to generate simulating data (D). The program further comprises a program code for predicting forecast data by processing the simulating data (D) using a predictive model. Further, the program comprises a program code for determining a prescriptive value (x') based on the forecast data by using an optimization model. Further, the optimization model determines the prescriptive value (x') in a manner such that an objective function associated with the optimization model is optimized, whereby the optimization of the objective function indicates a business objective being achieved. The program is further comprises a program code for iteratively performing the steps of the simulating, the predicting and the determining until the objective function is not further optimized, satisfying a predefined condition. Further, in each iteration, except the first iteration, the input data ($x_{input}$) is the prescriptive value (x') determined at immediate previous iteration, whereas in the first iteration, the input data ($x_{input}$) is a reference data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for providing data analytics, more particularly, prescriptive analytics are described. There are several approaches available for performing the data analytics. One of the approaches available is predictive analytics. Generally, these type of data analytics i.e., predictive analytics are required for improving business processes. The business processes may be associated with structural activities that may result in a specific service or a product. These services or the products may be availed by a group of users or customers in a particular domain. While availing such services or products, the customer has to come across different stages associated with the service or the product. In some of the stages, prediction is required to predict future possibilities for helping the customer to take an appropriate decision. For example, demographic data about consumers may be used to predict their buying behavior. In another example, historical patterns of warranty claims may be used for predicting future part-wise failures.

However, the aforementioned predictions of the buying behavior and the future part-wise failures by themselves may not provide any specific actions for optimizing the business processes or an objective function indicative an objective or goal of the businesses. In one embodiment, the objective function may be minimizing cost or maximizing profit. In another embodiment, the objective functions may be like what price to be charged to the customers, how much cost or stock to provision for warranty part replacement, and the like. Thus, the predictive analytics are limited by providing only future possibilities or future outcomes to the user.

In accordance with the present disclosure, in order to optimize the objective function and thereby achieve a business objective, an advanced method of data analytics is proposed herein, i.e., the prescriptive analytics. In one embodiment, for executing the prescriptive analytics, a prescriptive information fusion (PIF) framework is disclosed in present disclosure. The PIF framework may be based on a Bayesian formulation. In general, in the prescriptive analytics, the objective function may be evaluated by an optimization procedure by using an output of the predictive analytics. Considering a scenario, for deciding how many resources to provision for warranty claims, it may be required to forecasts the part-wise failures based on a statistical or predictive model derived from past data. In another scenario, for deciding highly personalized pricing strategies, it may be required to know how demand correlates with attributes of the customers, whereby the attributes may be computed by the predictive model. According to embodiments of present disclosure, the prescriptive analytics may be performed in scientific as well as enterprise domain.

Further, information related to the scientific and the enterprise domain, may be received from diverse sources which may be fused to improve the predictions as well as prescriptions by the PIF framework. In some scenarios, the predictive model in combination with an optimization model may be used. For example, the output of the predictive model may be taken as an input in the optimization model in order to decide a best strategy for optimizing the objective function. Consider a situation where a business strategy (i.e., pricing or advertising of a product); themselves may affect behavior of the consumer or customer. In such situation, the predictive model may need to model the behavior of the consumer by taking into account the business strategy considered in practice. This may lead to making the prediction-optimization process iterative, thus resulting in a time consuming process. Apart from time consuming, the business strategy proposed may also not be advisable to be implemented, as sub-optimal policies, related to the business strategy, might result in a significant business loss. This is because, the business decisions actually executed in a real world may rarely cover more than a small fraction of the possible design space of the business strategy proposed in the past, and the predictive and prescriptive models will not be accurate for such choices. Thus, the simulation may be required, along with prediction and optimization, to overcome this concern.

Considering a scenario from a manufacturing domain, where a task is to design a better product or a manufacturing process, an experimental data regarding a new product design or any particular manufacturing process is generally unavailable. Thus, a theory-based simulation may be used instead. But, though the scientific theories on which simulations rely are those matching with experiments, it may be far more general level than the particular product or the process being designed. So, actually what is needed may be reverse i.e., a most cost-effective design parameters or process parameters for achieving a desired product properties. Therefore, the PIF framework disclosed in the present disclosure provides an inverse inference by summarizing data from a simulation model using statistical predictive models to ease the search for optimal parameters (i.e., the design parameters or the process parameters). Further, the simulation model may themselves be tuned using an experimental data with the help of the predictive models. Thus, the PIF framework integrates a predictive model, an optimization model, and the simulation model in order to improve the predictions and the prescriptions.

While aspects of described system and method for executing prescriptive analytics may be implemented in any number of different computing systems, environments, or configurations, the embodiments are described in the context of the following exemplary system.

Figure 1:
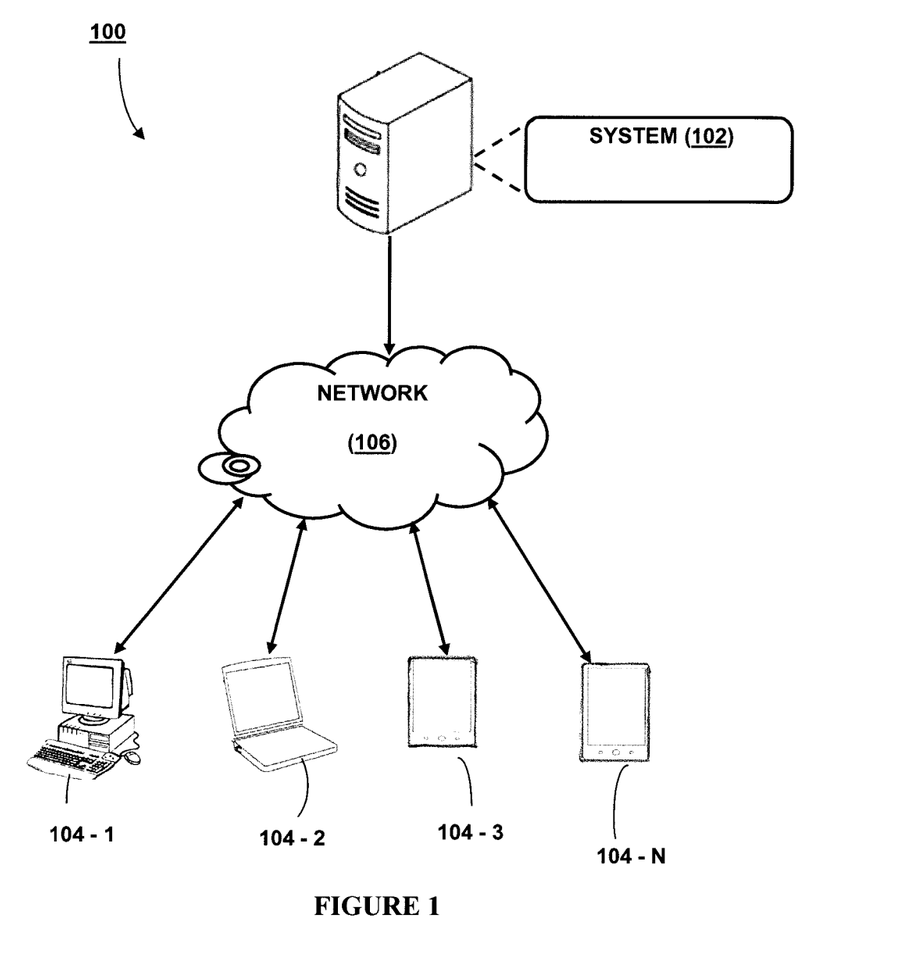
FIG. 1 illustrates a network implementation of a system for performing prescriptive analytics, in accordance with an embodiment of the present subject matter.

Referring to FIG. 1, a network implementation 100 of system 102 for executing prescriptive analytics is illustrated, in accordance with an embodiment of the present subject matter. Although the present subject matter is explained considering that the system 102 is implemented for executing the prescriptive analytics on a server, it may be understood that the system 102 may also be implemented in a variety of computing systems, such as a laptop computer, a desktop computer, a notebook, a workstation, a mainframe computer, a server, a network server, a tablet, a mobile phone, and the like. In one embodiment, the system 102 may be implemented in a cloud-based environment. It will be understood that the system 102 may be accessed by multiple users through one or more user devices 104-1, 104-2, 104-3, 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
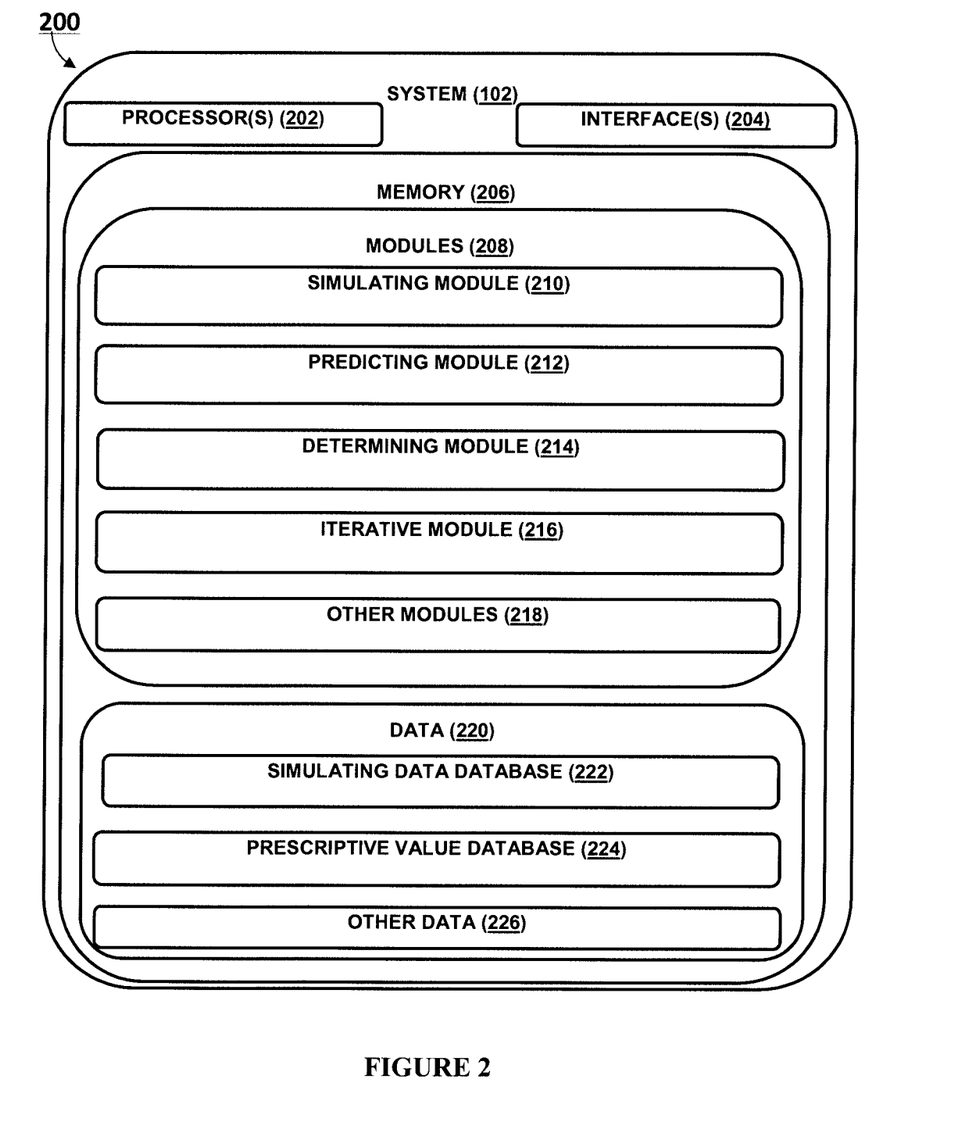
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 220.

The modules 208 include routines, programs, objects, components, data structures, etc., which perform particular tasks or implement particular abstract data types. In one implementation, the modules 208 may include a simulating module 210, a predicting module 212, determining module 214, iterative module 216, and other modules 218. The other modules 218 may include programs or coded instructions that supplement applications and functions of the system 102.

The data 220, amongst other things, serves as a repository for storing data processed, received, and generated by one or more of the modules 208. The data 220 may also include a simulating data database 222, a prescriptive value database 224, and other data 226. According to embodiments of present disclosure, the data 220 of the system 102 may also include the predicted data and the past data.

Referring now to FIG. 3A-3D, illustrates different methodologies for executing the prescriptive analytics in detail, in accordance with various embodiment of the present subject matter. For facilitating the execution of the prescriptive analytics, the prescriptive information fusion (PIF) framework may be implemented in the system 102. The PIF framework may be explained in step-wise manner referring FIG. 3A to 3D. FIGS. 3A, 3B, 3C, and 3D illustrates an open loop prescriptive analytics, an adaptive prescriptive analytics, a simulation based prescriptive analytics, and the full PIF framework respectively. Initially, the open loop prescriptive analytics (referring FIG. 3A) is explained in detail. In the FIG. 3A a conventional predictive analytics approach is shown in which a past data (Y) may be modeled using the predictive model (M). The past data (Y) is also referred as a real data or an experimental data throughout the specification. Further, the predictive model (M) may generate a distribution P (y|M) which may be used as a predictor for future values. For example, suppose the past data (Y) captures part failures over a time in a population of vehicles in the field, the part failures may be modeled using a Weibull distribution, using which an expected number of failures in the future can be computed using the distribution P (y|M).

Figure 3A:
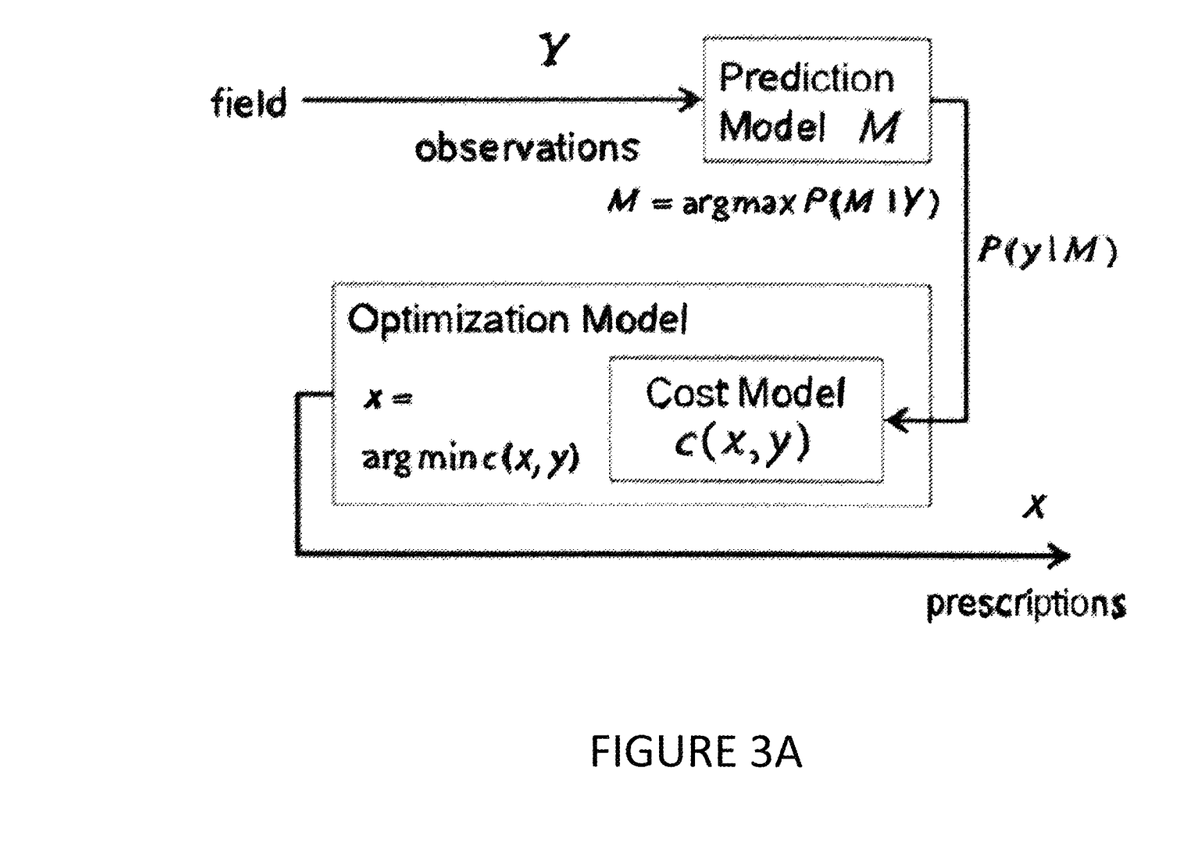
FIG. 3A-3D illustrates different methodologies for executing prescriptive analytics in detail, in accordance with various embodiments of the present subject matter.

Through the traditional predictive analytics only the future outcomes or future possibilities may be predicted, and therefore, the traditional predictive analytics do not provide any prescriptive actions. To overcome this limitation, the prescriptive analytics as disclosed herein, links the predictive model (M) and the optimization model as shown in FIG. 3A. The link is made in such a manner that an output of the predictive model (M) is taken as input to the optimization model. For example, the predicted failures can be used to provision sufficient funds to cover warranty claims to optimally balance commercial penalties that may arise due to over provisioning or under provisioning.

It may be noted that the prediction procedure as shown in the FIG. 3A may be formulated as a Bayesian model selection i.e., a most probable predictive model M' may be chosen for available data Y'. Such predictive models may yield probabilistic predictions of the volume of future failures (y) i.e., P (y|M), using which $c(x, y)$ i.e., the penalty for the over provisioning or the under provisioning for any particular warranty provisioning outlay and the predicted failure volume may be computed. In one example, the predictive model (M) might predict failures for different parts $y_i$, each attracting different penalties for the over provisioning and the under provisioning. Thus, the optimization stage may need to choose the provisioning strategy which may minimize the expected penalties under the distribution P (y|M), i.e., total penalty for all parts at an aggregate level.

Figure 3B:
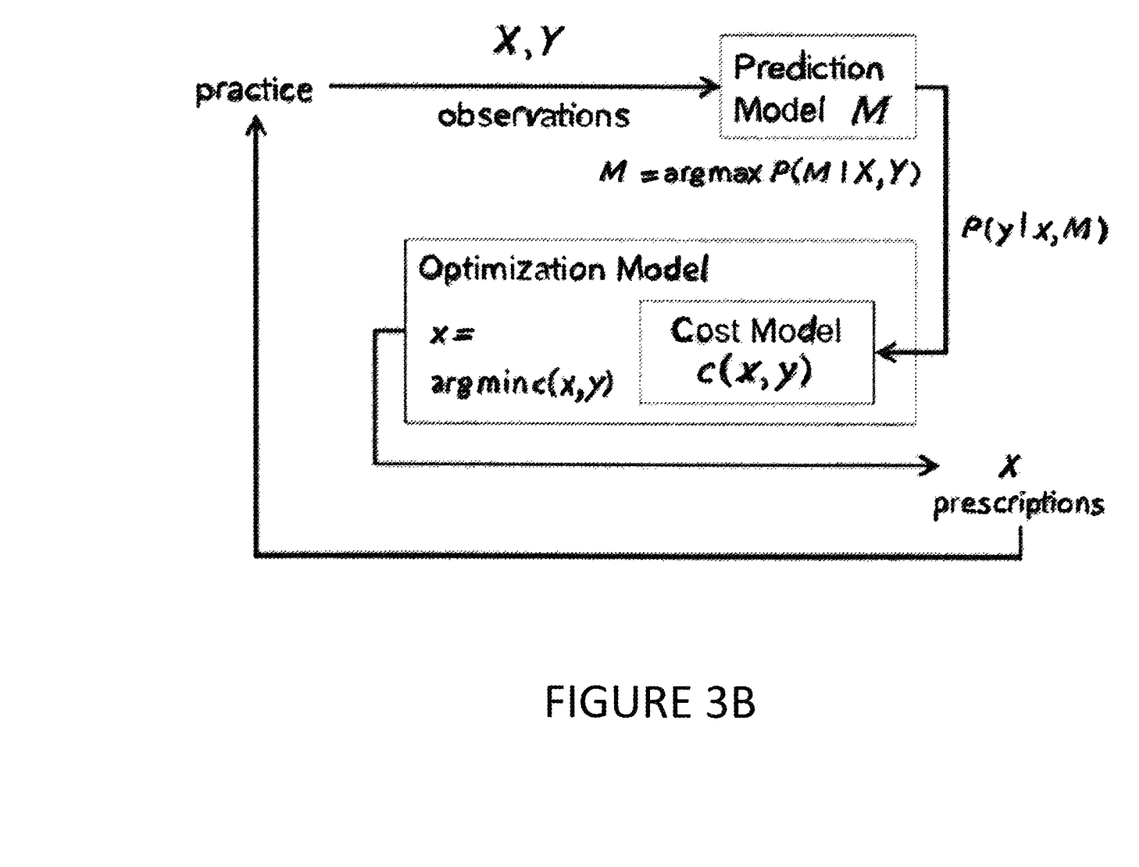

Further, the FIG. 3B illustrates an adaptive prescriptive analytics in closed-loop environment. In the previous implementation the actual occurrence of event may not change, e.g., part failure rate. However, in some domains it may not happen that way and the event occurrence itself may get altered because of optimized strategy. According to embodiments of present disclosure, the FIG. 3B may be considered for supporting a task for pricing consumer-goods differently based on consumers' willingness to pay. In such a case, a strategy of what price to charge whom can indeed affect the amount people buy and in turn the total revenue that accrues. According to the FIG. 3B, when an optimal strategy (x) is put into practice, it becomes a part of an input data ($x_{input}$). Further, the past data (Y) may be monthly sales data (in this case), whereby by modeling the monthly sales data, expected future sales can be forecasted using the predictive model (M). Also, the predictive model (M) results in a distribution P (y|x, M) can be used to estimate one component of y, which may be a sales quantity, from other elements such demographics, etc. as well as quoted price x. Considering a case in which the monthly sales data i.e., Y includes how much an item/product is sold to the customer (i.e., $y_s$), as well as their (customer's) demographic profile (i.e., $y_d$), so that $y=[y_s+y_d]$. Based on the monthly sales data, a posterior distribution may be estimated as P ($y_s|y_d$, x, M). Further, the predictive model (M) may be enabled to cluster the customers based on their demographic profile and other information followed by linear regression within each cluster yielding a price elasticity model ys=b−mx, which becomes the mean of a Gaussian posterior for the demographic profile represented by each cluster k, thus P ($y_s$|k, x, M)=N (bk−$m_k$x, σ).

Next, in the optimization stage, the objective may be to choose a pricing strategy i.e., a separate price $x_k$ for each cluster k in order to maximize the sales revenue (i.e., $y_s*x_k$) which may be summed over all the customers. Such optimizations may be traceable when the number of strategies i.e., "l" price slabs $\pi=\{\pi 1 \ldots \pi 1)\}$, and segments k is small. In one instance, given k segments and a pricing strategy x={x1 ... x2}, the expected revenue from such an assignment can be computed easily, either using the P ($y_s$|k, x, M)=N (bk−$m_k$x, σ) or by assuming the behavior of each customer in the cluster which may be governed by the cluster mean, i.e. ys=$b_k$−$m_k x_k$. As there are $l^k$ possible pricing assignments, the complexity of arriving at an optimal assignment for given k clusters may be O ($nl^k$), where n is the number of consumers.

In the present case, the clusters along with their regression coefficients are an input to the optimization stage. However, these two steps appear to be decoupled, and indeed this is actually the case in many of the organizations performing data analytics. In simple words, the predictive modeling and the forecasts it produces are merely inputs used for business strategy, rather than the two being an integrated activity. However, it can be shown through the experiments that, the optimal strategy does indeed depend on the choice of the predictive model (M), and so feeding the prescribed strategies X back into further prediction iterations is of benefit. According to embodiments of present disclosure, the predictive model (M) may be chosen based not only on the past data (Y), but also on X (i.e., the prescribed strategies). Therefore, the clustering may be based on the demographic of the customers as well as their consumption behavior in response to the pricing strategy.

Figure 3C:
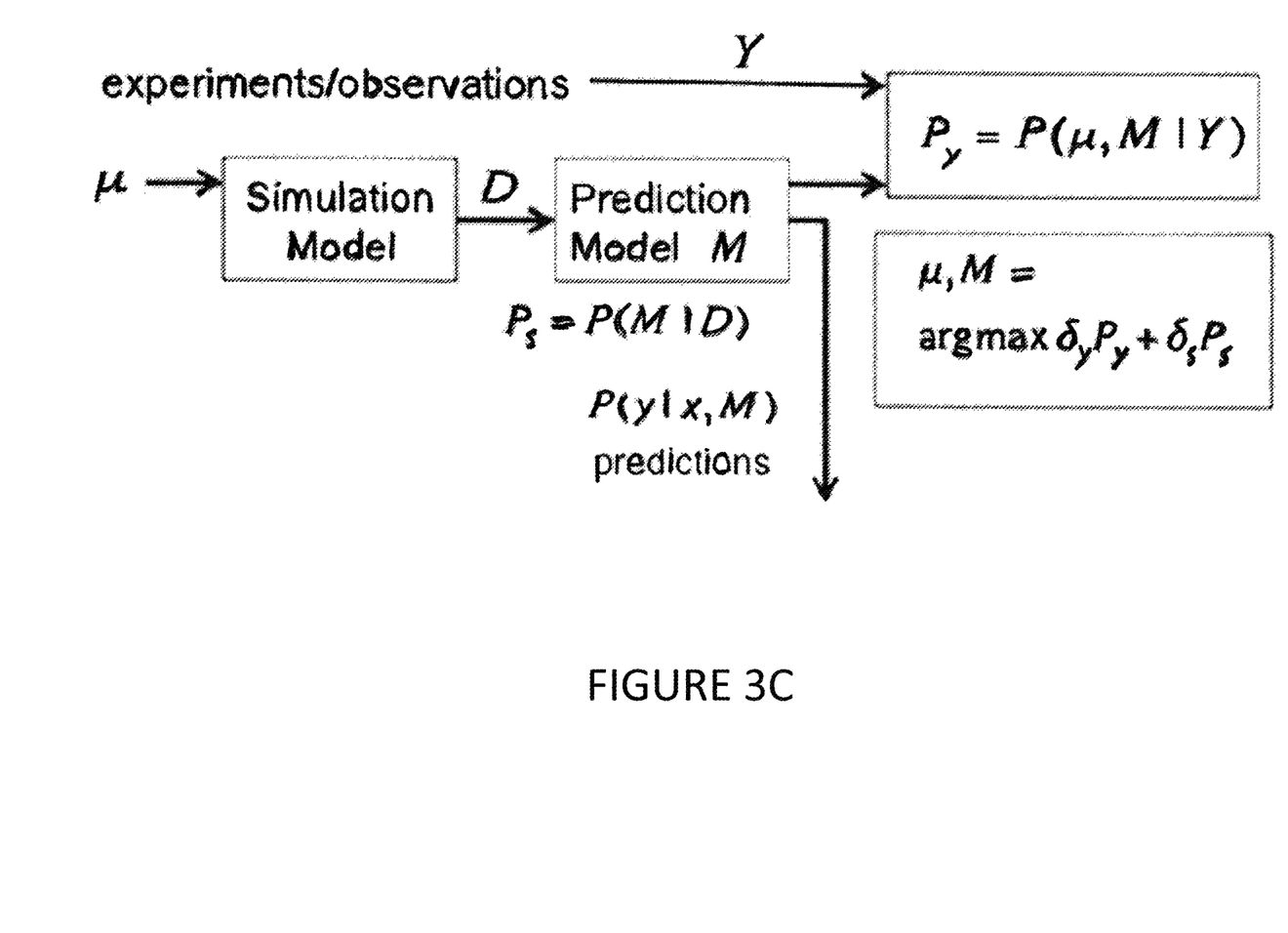

Further, the FIG. 3C illustrates the role of the simulation model in the prescriptive analytics. Considering the above customer sales example, it was assumed that the strategies chosen were actually implemented in practice, so that later iterations can take into account customer's responses to different prices and use actual observations of both Y and X to derive the predictive model (M). But, in practice it might not be a case at all, instead only a small set of variations may actually be tested in the field, or even none at all, since at least in traditional enterprises, such business decisions are made 'strategically', for example, as on a quarterly basis. In such a case, the closed-loop adaptive analytics (as explained in FIG. 3B) becomes difficult or even next to impossible to implement.

To overcome such situation, the simulation based prescriptive analytics employing the simulation model is disclosed as shown in the FIG. 3C. The simulation model may be selected based on domain-specific theories, for example, a physical system or a human behavior. According to embodiments of present disclosure, the human behavior may include information or factors such as how people behave when presented with discounts as opposed to merely lower prices, how such behaviors depend on their demographic profiles, influence of friends, social network and the like.

According to an embodiment, the simulation model may take an input x and parameter g as an input to produce a simulating data D. Often such simulations take a long time to execute, making it hard to perform inverse analysis. Further, the predictive model (M) may be used to summarize results of many simulation runs. The predictive model (M) may be used to perform an inverse analysis, whereby the inverse analysis reduces to a posterior distribution P ($y_{in}$/$y_{out}$, D, M). Further, the $y_{in}$ is input parameters in the simulation model and the $y_{out}$ is the desired behavioral output. According to embodiments of present disclosure, the $y_{in}$ is equivalent to the simulation parameters (μ) and the prescriptive values (x') i.e., $x_{input}$, and the desired behavioral output $y_{out}$ is equivalent to the simulating data (D) (as per FIG. 3D). Further, arrangement of the simulation model along with the predictive model (M) and the optimization model is explained in FIG. 3D in detail.

Figure 3D:
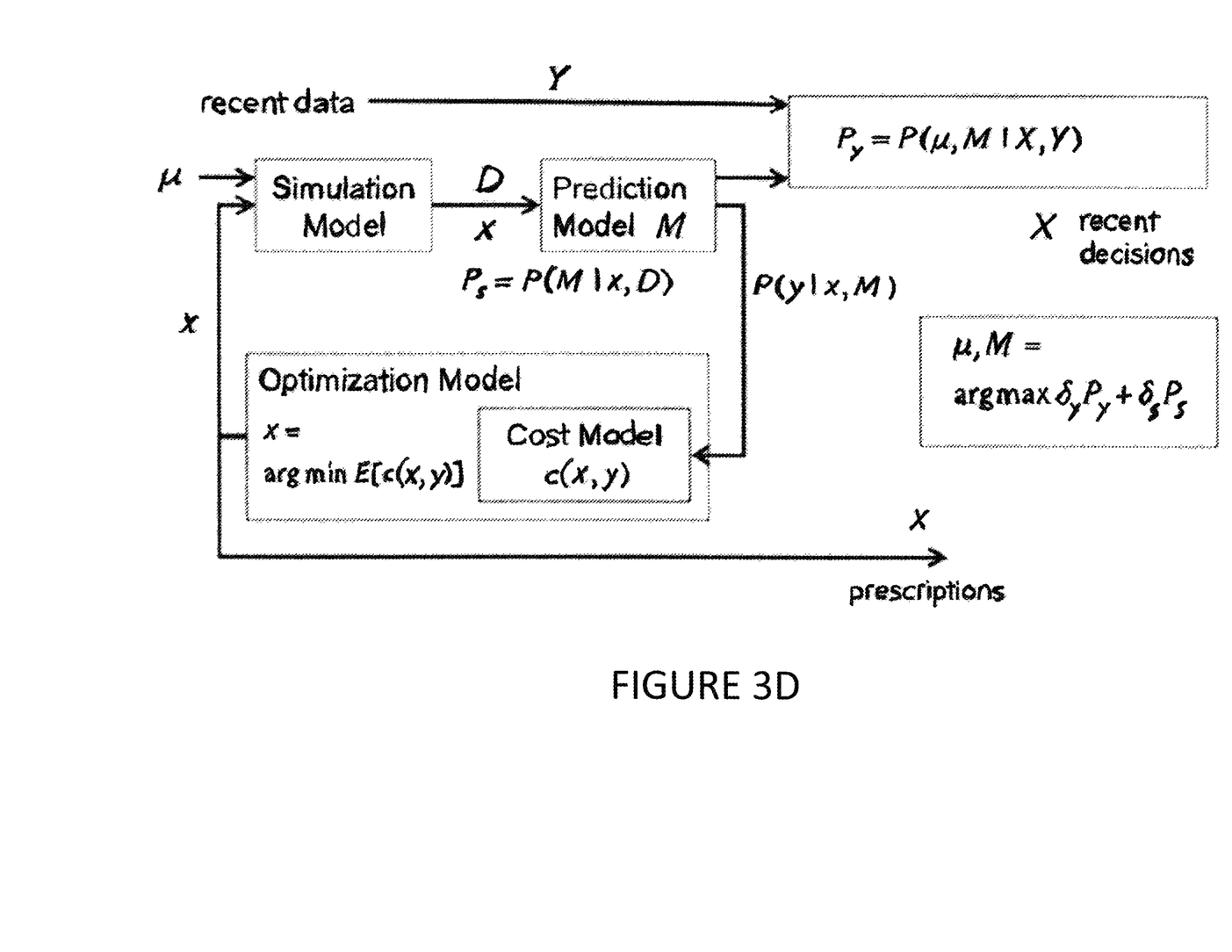

FIG. 3D corresponds to the PIF framework implemented in the system 102 disclosed in the present disclosure. The simulation model is generally used for augmenting the past data or an experimental data collectively called as a "real data" (Y) considered an input. The simulation model may receive an input data ($x_{input}$) and simulation parameters (μ) as the input. After receiving the input, the simulating module 210 of the system 102 simulates from an input data ($x_{input}$) based on the simulation parameters (μ) in order to generate a simulating data (D). The simulating data (D) may be stored in a simulating data database 222 of the system 102. Further, the simulation parameters (μ) and the simulation model may be chosen such that the simulating data (D) is matched with the real data (Y) observed corresponding to the input data (x). In one embodiment, the simulation parameters (μ) may be considered as assumptions about the physical system being studied.

Next, the predicting module 212 of the system 102 may predict forecast data by processing the simulating data (D) using the predictive model (M). In the prediction stage, the predictive model (M) may summarize results of many simulation runs i.e., output of the simulation model. One of a purpose of using the predictive model (M) is to perform inverse analysis i.e., computing what input parameters should produce a particular output. Thus, the statistical model serves two purposes, first to summarize the results of the simulation model and second, to ensure that results of overall process may not get divorced from the real data Y.

Further, the determining module 214 of the system 102 may determine a prescriptive value (x') based on the forecast data by using an optimization model. The prescriptive value (x') determined may be stored in prescriptive value database 224 of the system 102. Further, the prescriptive value (x') may be determined in such a manner that an objective function associated with the optimization model gets optimized, whereby the optimization of the objective function indicates a business objective being achieved. According to embodiments of present disclosure, the objective function may be minimizing cost or maximizing profit. In another embodiment, the objective function may be like what price to be charged to the customers, how much cost or stock to provision for warranty part replacement and the like.

From the FIG. 3D, it may be observed that the optimization model serves to choose an appropriate design inputs "x" for minimizing the cost model c(x, y), which may be the actual target of the predictive model (M). In order to achieve the target, the simulation model and the simulation parameters (µ) may be chosen in a Bayesian spirit to maximize the probability of observed data X and Y, and simulated data D. Thus, as depicted in the FIG. 3D, the predictive model and the simulation parameters (µ) are chosen so as to maximize $$\delta_s P(M|x,D,)+\delta_y P(M|X,Y) \quad \text{equation 1.}$$

Where the $\delta_s$ and $\delta_y$ control the relative weights of the simulating data in relative to the real world data. By using the above equation 1, the predictive model (M) may be itself learned based on the simulating data (D). Further, the simulating data (D) which is generated based on the input data ($x_{input}$) and the simulation parameters (µ) are learned using the equation 1. After performing the steps of simulating, predicting, and determining, a next optimal prescriptive value (x') is then computed to minimize an expected E[c(x, y)] under the posterior distribution P i.e., $$x = \underset{x}{\operatorname{argmin}} E[c(x, y)] = \underset{x}{\operatorname{argmin}} \int_y c(x, y) P(y|x, M) \quad \text{equation 2}$$

Thus, in the next stage of the prescriptive analytics, the iterative module 216 of the system 102 instructs the simulating module 210, the prediction module 212, and the determining module 214 to iteratively perform the steps of the simulating, the predicting, and the determining respectively, until the objective function is not further optimized, satisfying a predefined condition. That is, the iterations may be performed until the predefined condition is satisfied. The predefined condition may in one example, a predefined sales profit set by an enterprise corresponding to a predefined sales volume forecasted for a specific product. Similarly, the predefined condition may include, in another example, a predefined value of funds to be provisioned for warranty claims. Thus, iterations may be performed until the predefined condition is met or achieved. Alternatively, the iterations may be stopped when the objective function cannot be further optimized.

In an embodiment, in each iteration of the multiple iterations, except the first iteration, the input data ($x_{input}$) is the prescriptive value (x') determined at immediate previous iteration. In the first iteration, the input data ($x_{input}$) is a reference data or apriori information required to initiate the simulation process thereby generating simulating data D, and subsequently implementing the method steps in the PIF framework. One skilled in the art would realize and appreciate that such iterative based prescriptive analytics is required since the real-world may not include enough coverage of possible strategies "x", and hence the need of simulation arises. Next, the simulation, both based on the physical systems or the human behavior are computationally expensive and time consuming to run for each choice of the possible strategy x and the simulation parameters (µ). Hence, the sets of x for which simulations need to be run have to be narrowed down.

Considering an example where a best-guess choice of the simulation parameter ($µ^0$) may be considered for generating a simulating data ($D^0$) for a range the strategies ($x^0$) against a reasonably varied neighborhood of the actually executed strategies X having the real-world data as Y. On basis of above scenario, an optimal strategy ($x^1$) may be computed. Now, based on the initial model $M^0$ fitted using these runs, the guess for the unknown simulation parameters to $µ^1$ may be refined. Further, the system 102 may re-run the simulation, also expanding the range of strategies further to $\{x^1\}$, and this time also expanding the set in a large neighborhood of $x^1$. Further, the resulting augmented data set [$D^1$, $D^2$] may be used to fit a revised model $M^2$ using which the system 102 may further update the simulation parameters from $µ^1$ to $µ^2$, and so on. The system 102 iteratively repeats this process until the system is unable to make further progress in the optimization of the cost model c(x, y) while also adequately fitting the few real-world observations i.e., the input data ($x_{input}$).

Figure 4:
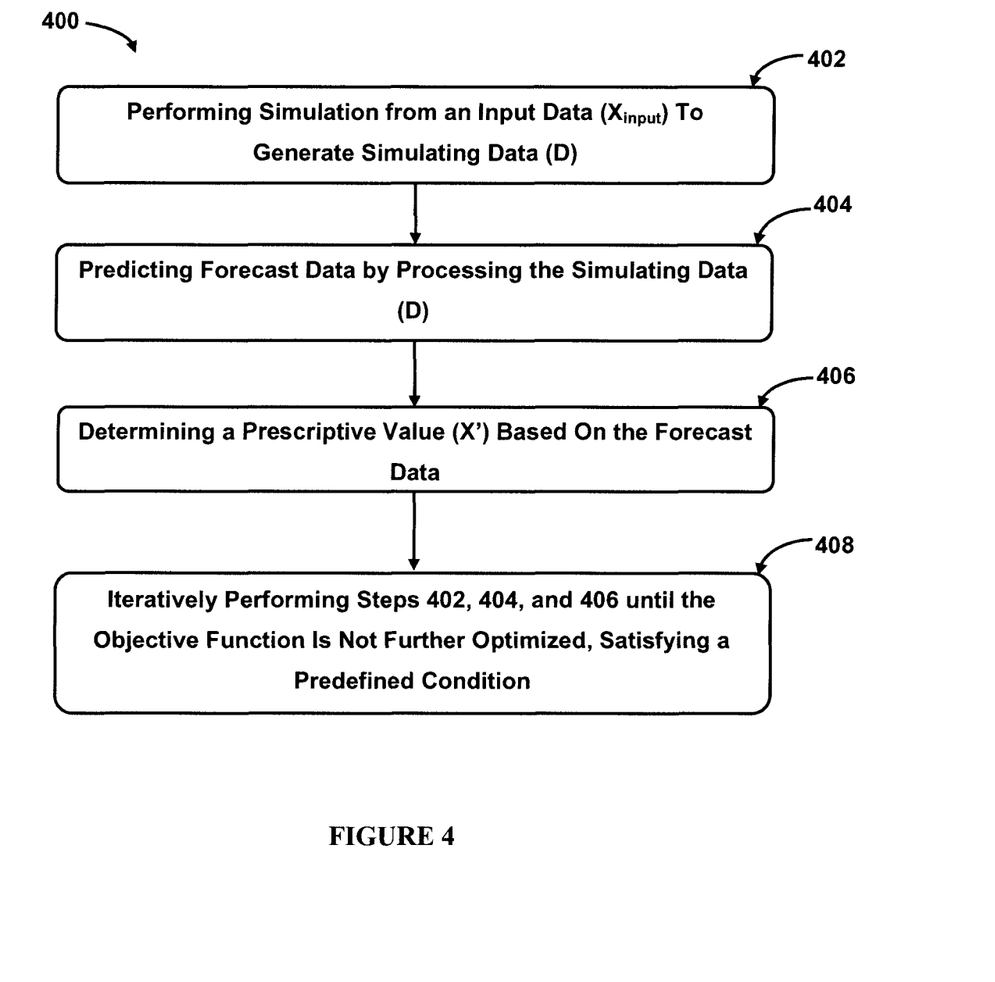
FIG. 4 illustrates a method for executing prescriptive analytics, in accordance with an embodiment of the present subject matter.

Referring now to FIG. 4, the method of executing prescriptive analytics is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a step of simulation may be performed from an input data ($x_{input}$) and simulation parameters (µ) in order to generate simulating data (D). Further, the simulation may be performed using a simulation model.

At block 404, forecast data may be predicted by processing the simulating data (D), whereby the prediction may be performed by using a predictive model (M).

At block 406, a prescriptive value (x') may be determined based on the forecast data using an optimization model. Further, the prescriptive value (x') may be determined in such a manner that an objective function associated with the optimization model is optimized, whereby the optimization of the objective function indicates a business objective being achieved.

At block 408, the steps performed in the blocks 402, 404, and 406 are iteratively performed until the objective function is not further optimized, satisfying a predefined condition. Further, at each iteration, except the first iteration, the input data ($x_{input}$) is the prescriptive value (x') determined at immediate previous iteration, whereby at the first iteration, the input data ($x_{input}$) is a reference data.

Although implementations for methods and systems for executing the prescriptive analytics have been described in language specific to structural features or methods, it is to be understood that the appended claims are not necessarily limited to the specific features or methods described. Rather, the specific features and methods are disclosed as examples of implementations for executing the prescriptive analytics.

We claim:
1. A method for executing prescriptive analytics, the method comprising:
   simulating from an input data ($x_{input}$) and simulation parameters ($\mu$), using a simulation model, in order to generate simulating data (D);
   predicting forecast data by processing the simulating data (D), summarizing results of the simulation model and performing inverse analysis using a predictive model (M), wherein the predictive model (M) ensures that result of processing the simulating data (D) is in-line with a real data (Y) and self-learned based on the simulating data (D), wherein the predictive model (M) is chosen based on the real data (Y) and prescribed strategies X;
   determining a prescriptive value (x') based on the forecast data by using an optimization model, wherein the optimization model determines the prescriptive value (x') in a manner such that an objective function associated with the optimization model is optimized, wherein the optimization of the objective function indicates a business objective being achieved, wherein a link is established between the predictive model (M) and the optimization model such that an output of the predictive model (M) is taken as an input to the optimization model, wherein the determined prescriptive value (x') is stored in a prescriptive value database, wherein the predictive model (M) is enabled to cluster customers based on their demographic profile and their consumption behavior in response to a pricing strategy followed by linear regression within the cluster yielding a price elasticity model;
   iteratively performing the steps of the simulating, the predicting and the determining, by a processor, until the objective function is not further optimized, satisfying a predefined condition, wherein in each iteration, except the first iteration, the input data ($x_{input}$) is the prescriptive value (x') determined at immediate previous iteration, and wherein in the first iteration, the input data ($x_{input}$) is a reference data;
   facilitating execution of the prescriptive analysis using a prescriptive information fusion (PIF) framework using the real data (Y), wherein the PIF framework provides an inverse inference by summarizing data from the simulation model using the predictive model (M) to ease search for design parameters, and wherein the simulation model is tuned with the predictive model (M) using an experimental data;
   generating a distribution curve as a predictor for one or more future values, wherein the generated distribution curve summarize results of a simulation run-in; and
   re-running the simulation by expanding a range of pricing strategies and neighborhood of pricing strategies, and the resulting augmented data set fits a revised model and update the simulation parameters.

2. The method of claim 1, wherein the simulation parameters ($\mu$) and the simulation model are chosen such that the simulating data (D) is matched with the real data (Y) observed corresponding to the input data ($x_{input}$).

3. The method of claim 2, wherein the simulation parameters ($\mu$) and the simulation model are chosen in a Bayesian spirit such that the probability of observed data (X) and (Y), and simulated data (D) in equation (1) is maximized, where the equation (1) being $\delta_s P(M|x, D,) + \delta_y P(M|X, Y)$, wherein the ($\delta_s$ and $\delta_y$) controls relative weight of the simulating data (D) in relative to a real-world data, and wherein the simulating data (D) is generated using simulation model.

4. The method of claim 1 further comprises computing the prescriptive value (x') such that an expected cost model E[c(x, y)] under a posterior distribution P in equation (2) is minimized, where the equation (2) being $$x = \mathrm{argmin}_x E[c(x, y)] = \mathrm{argmin}_x \int_y c(x, y) P(y \mid x, M),$$

wherein the E[c(x, y)] indicates the objective function to be optimized.

5. The method of claim 1, wherein the simulation model is selected based on domain-specific theory, wherein the domain-specific theory is at least one of a physical system and a human behavior.

6. A system implemented in a cloud-based environment for executing prescriptive analytics, the system comprising:
   a processor and at least one memory comprising a plurality of instructions, said instructions executed by the processor to:
      simulating module executed by the processor to simulate an input data ($x_{input}$) and simulation parameters ($\mu$), using a simulation model, in order to generate simulating data (D);
      predicting module executed by the processor to predict forecast data by processing the simulating data (D), summarizing results of the simulation model and performing inverse analysis using a predictive model (M), wherein the predictive model (M) ensures that result of processing the simulating data (D) is in-line with a real data (Y) and self-learned based on the simulating data (D), wherein the predictive model (M) is chosen based on the real data (Y) and prescribed strategies X;
      determining module executed by the processor to determine a prescriptive value (x') based on the forecast data by using an optimization model, wherein the optimization model determines the prescriptive value (x') in a manner such that an objective function associated with the optimization model is optimized, and wherein the optimization of the objective function indicates a business objective being achieved, wherein a link is established between the predictive model (M) and the optimization model such that an output of the predictive model (M) is taken as an input to the optimization model, wherein the determined prescriptive value (x') is stored in a prescriptive value database, wherein the predictive model (M) is enabled to cluster customers based on their demographic profile and their consumption behavior in response to a pricing strategy followed by linear regression within the cluster yielding a price elasticity model;
      iterating module executed by the processor to iteratively perform the steps of the simulating, the predicting and the determining respectively until the objective function is not further optimized, satisfying a predefined condition, wherein in each iteration, except the first iteration, the input data ($x_{input}$) is the prescriptive value (x') determined at immediate previous iteration, and wherein in the first iteration, the input data ($x_{input}$) is a reference data;

facilitating execution of the prescriptive analysis using a prescriptive information fusion (PIF) framework using the real data (Y), wherein the PIF framework provides an inverse inference by summarizing data from the simulation model using the predictive model (M) to ease search for design parameters, and wherein the simulation model is tuned with the predictive model (M) using an experimental data;

predicting module executed by the processor to generate a distribution curve as a predictor for one or more future values, wherein the generated distribution curve summarize results of a simulation run-in; and re-run the simulation by expanding a range of pricing strategies and neighborhood of pricing strategies, and the resulting augmented data set is used to fit a revised model to update the simulation parameters.

7. The system of claim 6, wherein the simulation parameters ($\mu$) and the simulation model (S) are chosen such that the simulating data (D) is matched with the real data (Y) observed corresponding to the input data ($x_{input}$).

8. The system of claim 7, wherein the simulation parameters ($\mu$) and the simulation model are chosen in a Bayesian spirit such that the probability of observed data (X) and (Y), and simulated data (D) in equation (1) is maximized, where the equation 1 being $\delta_s P(M|x, D,) + \delta_y P(M|X, Y)$, wherein the ($\delta_s$ and $\delta_y$) controls relative weight of the simulating data (D) in relative to a real-world data, and wherein the simulating data (D) is generated using simulation model.

9. The system of claim 6 further comprises computing the prescriptive value (x') such that an expected cost model E[c(x, y)] under a posterior distribution P in equation (2) is minimized, where the equation (2) being:

$$x = \mathrm{argmin}_x E[c(x, y)] = \mathrm{argmin}_x \int_y c(x, y) P(y \mid x, M),$$

wherein the E[c(x, y)] indicates the objective function to be optimized.

10. A non-transitory computer readable medium embodying a program executable in a computing device for executing prescriptive analytics, the program comprising:

a program code for simulating from an input data ($x_{input}$) and simulation parameters ($\mu$), using a simulation model, in order to generate simulating data (D);

a program code for predicting forecast data by processing the simulating data (D), summarizing results of the simulation model and performing inverse analysis using a predictive model (M), wherein the predictive model (M) ensures that result of processing the simulating data (D) is in-line with a real data (Y) and self-learned based on the simulating data (D), wherein the predictive model (M) is chosen based on the real data (Y) and prescribed strategies X;

a program code for determining a prescriptive value (x') based on the forecast data by using an optimization model, wherein the optimization model determines the prescriptive value (x') in a manner such that an objective function associated with the optimization model is optimized, and wherein the optimization of the objective function indicates a business objective being achieved, wherein a link is established between the predictive model (M) and the optimization model such that an output of the predictive model (M) is taken as an input to the optimization model, wherein the determined prescriptive value (x') is stored in a prescriptive value database, wherein the predictive model (M) is enabled to cluster customers based on their demographic profile and their consumption behavior in response to a pricing strategy followed by linear regression within the cluster yielding a price elasticity model;

a program code for iteratively performing the steps of the simulating, the predicting and the determining until the objective function is not further optimized, satisfying a predefined condition, wherein at each iteration, except the first iteration, the input data ($x_{input}$) is the prescriptive value (x') determined at immediate previous iteration, and wherein at the first iteration, the input data ($x_{input}$) is a reference data;

a program code for facilitating execution of the prescriptive analysis using a prescriptive information fusion (PIF) framework using the real data (Y), wherein the PIF framework provides an inverse inference by summarizing data from the simulation model using the predictive model (M) to ease search for design parameters, and wherein the simulation model is tuned with the predictive model (M) using an experimental data;

a program code for generating a distribution curve as a predictor for one or more future values, wherein the generated distribution curve summarize results of a simulation run-in; and a program code for re-running the simulation by expanding a range of pricing strategies and neighborhood of pricing strategies, and the resulting augmented data set is used to fit a revised model to update the simulation parameters.

* * * * *